Nov. 17, 1953
J. M. WEAR, JR
2,659,347
AUTOMATIC POULTRY DRINKING FOUNTAIN
Filed July 31, 1951
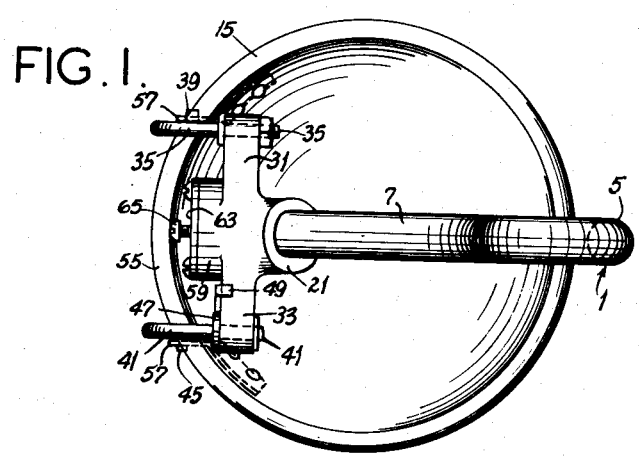
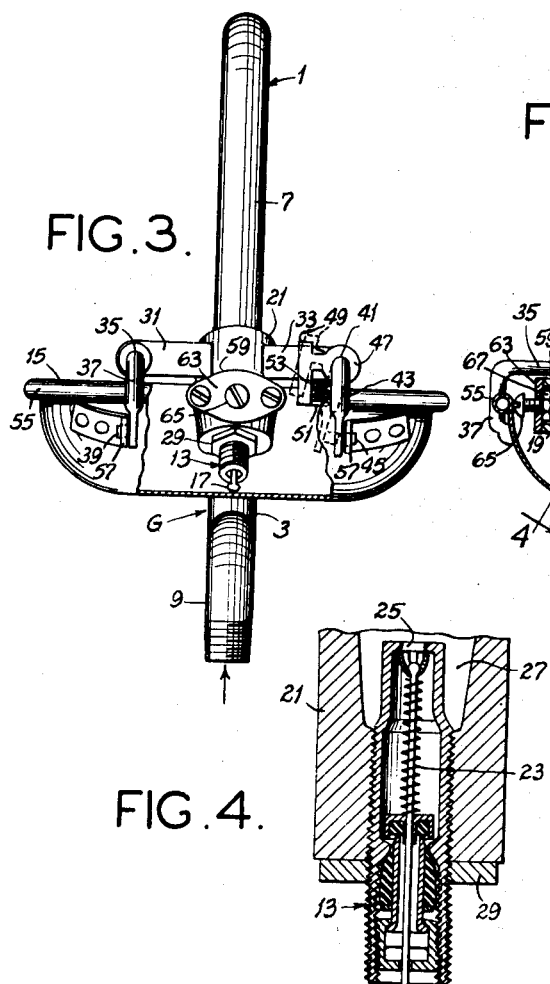
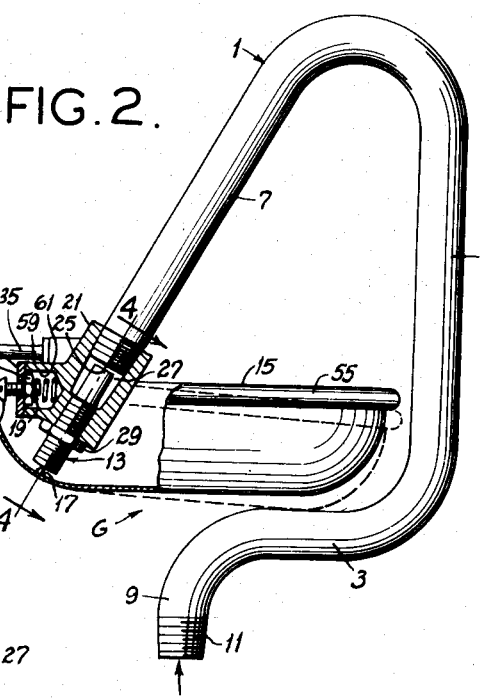
John M. Wear, Jr.,
Inventor.
Koenig and Pope,
Attorneys.

UNITED STATES PATENT OFFICE 2,659,347

AUTOMATIC POULTRY DRINKING FOUNTAIN

John M. Wear, Jr., Gray Summit, Mo., assignor to Ralston Purina Company, St. Louis, Mo., a corporation of Missouri Application July 31, 1951, Serial No. 239,491

7 Claims. (Cl. 119—81)

This invention relates to drinking fountains, and more particularly to such fountains for poultry.

The object of the invention is the provision of an improved drinking fountain, particularly for poultry, of the type having a drinking pan and means for automatically maintaining the pan filled with water. In general, a drinking fountain constructed in accordance with the invention comprises a water supply pipe bent to have a generally horizontal portion with an upright return bend having a downwardly directed portion ending above the level of the horizontal portion. At the lower end of the downwardly directed portion is a valve. A water pan is pivotally carried by the downwardly directed portion for rocking movement about a generally horizontal axis transverse to the horizontal portion. The pan extends from its pivot under the lower end of the downwardly directed portion and over the horizontal portion. The pan is biased to swing upward by means acting against the weight of water in the pan. The valve has an operating member actuated by the pan to open the valve to admit water to the pan when the pan swings upward above a predetermined level. The downward swing of the pan is limited by its engagement with the horizontal portion of the water supply pipe. Other features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawing, in which one of various possible embodiments of the invention is illustrated, Fig. 1 is a plan of a drinking fountain constructed in accordance with the invention;

Fig. 2 is a side elevation of Fig. 1, with parts broken away and shown in section;

Fig. 3 is a left side elevation of Fig. 2, with parts broken away and shown in section; and, Fig. 4 is an enlarged section taken on line 4—4 of Fig. 2.

Similar reference characters indicate corresponding parts throughout the several views of the drawing.

Referring to the drawing, a drinking fountain of this invention is shown to comprise a combination support and water supply means generally designated 1 consisting of a length of pipe bent to have a generally horizontal portion with an upright return bend having a downwardly directed portion ending above the level of the horizontal portion. More particularly, the pipe is bent to have a horizontal leg 3, an upright leg 5 extending vertically upward from one end of the horizontal leg, and an inclined leg 7 extending down from the upper end of the vertical leg above the horizontal leg. The length and inclination of the leg 7 are such that the lower end of the leg 7 is above the level of the horizontal leg 3 and there is a gap at G between the lower end of the leg 7 and the horizontal leg 3. A short leg 9 extends vertically downward from the other end of the horizontal leg 3, and is threaded at its end 11 for connection to a main supply pipe (not shown) connected to a source of water under pressure. The support 1 serves as a water supply pipe and has a valve 13 at the lower end of the inclined leg 7. The end 11 of the pipe constitutes an inlet, and the lower end of leg 7 constitutes an outlet.

A water pan 15 is pivotally mounted on the inclined leg for rocking movement about a generally horizontal axis extending transverse to and above the level of the horizontal leg 3. The pan extends from its pivot under the lower end of the inclined leg 7, in position to receive water from the inclined leg whenever the valve 13 is open, and extends over the horizontal leg so that the latter limits the downward swing of the pan. The valve 13 has an operating member consisting of a stem 17 actuated by the pan to open the valve when the pan swings upward above a predetermined level to admit water to the pan. The pan is biased to swing upward against the weight of water therein by biasing means including a spring 19.

More particularly, a fitting 21 is threaded on the lower end of the inclined leg 7. The valve 13, as shown, is a conventional well-known type of tire valve, in which the valve stem 17 is biased to closed position by a spring 23. Further details of the valve, shown in Fig. 4, are well known and hence will not be particularly described. The valve is threaded in an opening in the fitting 21 in line with the inclined leg 7, and the valve inlet at 25 is in communication with the leg 7 in a space 27 within the fitting. The outlet end of the valve projects from the fitting. The stem 17 is biased to a position wherein its lower end extends out of the outlet end of the valve. A lock nut for holding the valve in position is shown at 29.

Fitting 21 consists of a casting having laterally extending horizontal wings 31 and 33. It is threaded on the lower end of the inclined leg 7 so that the wings 31 and 33 extend transversely with respect to the plane of the legs 3, 5 and 7. Fixed in an opening at the free end of the wing 31 is a rod 35. This extends in the direction away from the upright leg 5, and has a downwardly extending arm 37 provided at its lower end with a laterally and outwardly projecting pivot pin 39. Rotating, in an opening at the free end of the other wing 33, is a rod 41. Like the rod 35, the rod 41 extends in the direction away from the upright leg 5 and has a downwardly extending arm 43 provided at its lower end with a laterally and outwardly projecting pivot pin 45.

Fixed to the rod 41 is a member 47 formed with a stop finger 49 overlying the wing 33, and also formed with a spring abutment 51 under the wing 33. A coil compression spring 53 reacts from the bottom of the wing 33 against the abutment to bias the arm 43 to the extended position illustrated in solid lines in Fig. 3 determined by engagement of the stop finger 49 with the top of the wing 33.

The pan 15 is a metal pan of shallow bowl shape having a reinforcing bead 55 around its rim. The pan is provided with a pair of apertured ears 57 receiving the pivot pins 39 and 45. The ears are located on the outside of the pan below the rim. The pivot pins define a generally horizontal pivotal axis for the pan, this axis extending transversely to and above the level of the horizontal leg 3, outward of the end of the inclined leg 7, and below the rim of the pan. The pan extends from the pivot under the fitting 21 on the lower end of the inclined leg 7, and over the horizontal leg 3.

The fitting 21 is formed with a horizontal boss 59 facing away from the upright leg 5 and having a recess 61 closed by a closure plate 63. The spring 19 is a compression spring located in the recess 61 acting in outward direction on a bolt 65 which is movable in an opening in the plate 63. The head of the bolt 65 engages the inside of the pan at its rim, above the pivotal axis of the pan, so that the spring biases the pan to swing upward about its pivot. A nut 67 is threaded on the bolt inside the plate 63 to keep the bolt in place. The spring acts against the nut.

The spring 19 acts against the weight of water in the pan, and its force is such that when the pan is full of water, the pan is maintained balanced in the generally horizontal position illustrated in solid lines in Fig. 2. In this position of the pan, the bottom of the pan is so spaced from the outer end of the valve 13 that the valve stem 17 is allowed to assume its valve-closing position. As the level of the water in the pan is lowered, as by reason of poultry drinking therefrom, and the weight of the water accordingly diminished, the pan is swung upwardly by the spring 19 to the point where the bottom of the pan has moved the valve stem 17 upwardly to open the valve and admit water to the pan. Water is admitted to the pan until its added weight is sufficient to cause the pan to swing down to its original position, whereupon the valve closes and cuts off the supply of water. If a fowl jumps on the pan, the pan can move no farther downward than the lower limiting position of swing determined by its engagement with the horizontal leg 3, this position being illustrated in dotted lines in Fig. 2.

The pivotal connection between the side of the pan and the fitting 21 at the lower end of the leg 7 is a quick-detachable connection and the pan may be quickly detached and removed by swinging the arm 43 to the dotted-line retracted position shown in Fig. 3 wherein the pivot pin 45 is retracted from the ear 57, and then withdrawing the pan through the gap G.

In view of the above, it will be seen that the several objects of the invention are achieved and other advantageous results attained.

As many changes could be made in the above constructions without departing from the scope of the invention, it is intended that all matter contained in the above description or shown in the accompanying drawing shall be interpreted as illustrative and not in a limiting sense.

I claim:

1. A drinking fountain, particularly for poultry, comprising a water supply pipe having a horizontal leg, an upright leg extending upward from one end of the horizontal leg, and an inclined leg extending down from the upper end of the upright leg above the horizontal leg, the lower end of the inclined leg being above the level of the horizontal leg, a valve at the lower end of the inclined leg having a downwardly projecting valve stem which, when raised, opens the valve, a water pan pivotally mounted on the inclined leg by means of a pivotal connection between the side of the pan and the inclined leg with the axis of the pivotal connection extending generally horizontally and transverse to the horizontal leg and above the level of the horizontal leg and on the side of the inclined leg opposite the upright leg, the pan extending from the pivotal connection under the lower end of the inclined leg and over the horizontal leg, biasing means including a spring carried by the inclined leg acting against the pan in such direction as to tend to cause the pan to swing upward against the weight of water in the pan, the valve stem being engageable by the pan to be lifted thereby as the pan swings upward to open the valve to admit water to the pan when the pan swings upward above a predetermined level, the pan having a lower limiting position of swing determined by its engagement with the horizontal leg.

2. A drinking fountain as set forth in claim 1 wherein the pivotal connection between the pan and the inclined leg is a quick-detachable connection.

3. A drinking fountain as set forth in claim 1 wherein the biasing means acts to apply a force to the pan on the inside of the pan adjacent its rim above the pivotal connection.

4. A drinking fountain, particularly for poultry, comprising a water supply pipe having a horizontal leg, an upright leg extending upward from one end of the horizontal leg, and an inclined leg extending down from the upper end of the upright leg above the horizontal leg, the lower end of the inclined leg being above the level of the horizontal leg, a fitting at the lower end of the inclined leg, a valve in the fitting having a downwardly projecting valve stem which, when raised, opens the valve, a water pan having a quick-detachable pivotal connection with the fitting, the axis of the pivotal connection being generally horizontal and transverse to the horizontal leg and on the side of the inclined leg opposite the upright leg and below the rim of the pan, the pan extending from the pivotal connection under the lower end of the inclined leg and over the horizontal leg, biasing means including a spring reacting from the fitting against the inside of the pan adjacent its rim in such direction as to tend to cause the pan to swing upward against the weight of water in the pan, the valve stem being engageable by the pan to be lifted thereby as the pan swings upward to open the valve to admit water to the pan when the pan swings upward above a predetermined level, the pan having a lower limiting position of swing determined by its engagement with the horizontal leg.

5. A drinking fountain as set forth in claim 4 wherein the quick-detachable pivotal connection of the pan to the fitting comprises a pair of apertured ears on the outside of the pan, and a pair of arms on the fitting having pivot pins received in the ears, one of said arms being swingable against a spring bias to retract its pin from the respective ear.

6. A drinking fountain, particularly for poultry, comprising a combination support and water supply means consisting of a length of pipe one end of which constitutes an inlet adapted for connection to a source of water under pressure and the other end of which constitutes an outlet, the pipe having a generally horizontal portion toward its inlet end which leads to a return bend of the pipe having a downwardly directed portion terminating at the outlet end of the pipe above the level of the horizontal portion, a water pan pivotally mounted on the downwardly directed portion of the pipe by means of a pivotal connection between the side of the pan and the downwardly directed portion of the pipe with the axis of the pivotal connection extending generally horizontally and transverse to the horizontal portion of the pipe and above the level of said horizontal portion and outward of said downwardly directed portion, the pan extending from the pivotal connection under the outlet end of the pipe and over the horizontal portion of the pipe, biasing means associated with the downwardly directed portion of the pipe acting on the pan in opposition to the weight of the pan and water in the pan in such direction as to tend to swing the pan upward away from the horizontal portion of the pipe, and a valve at the outlet end of the pipe having a movable operating member which is engaged by the pan and moved to open the valve to admit water from the pipe to the pan when the pan swings upward under the action of said biasing means upon depletion of water in the pan, downward swing of the pan being limited by engagement of the pan with the horizontal portion of the pipe.

7. A drinking fountain, particularly for poultry, comprising a combination support and water supply means consisting of a length of pipe one end of which constitutes an inlet adapted for connection to a source of water under pressure and the other end of which constitutes an outlet, the pipe having a horizontal leg toward its inlet end which leads to an upright leg and an inclined leg extending down from the upper end of the upright leg and terminating at the outlet end of the pipe above the level of the horizontal leg, a water pan pivotally mounted on the lower end of the inclined leg by means of a pivotal connection between the side of the pan and the inclined leg with the axis of the pivotal connection extending generally horizontally and transverse to the horizontal leg and above the level of said horizontal leg and outward of said inclined leg, the pan extending from the pivotal connection under the outlet end of the pipe and over the horizontal leg, spring means reacting from the inclined leg against the pan in opposition to the weight of the pan and water in the pan in such direction as to tend to swing the pan upward away from the horizontal leg, and a valve at the outlet end of the pipe having a movable operating member which is engaged by the pan and moved to open the valve to admit water from the pipe to the pan when the pan swings upward under the action of said biasing means upon depletion of water in the pan, downward swing of the pan being limited by engagement of the pan with the horizontal leg.

JOHN M. WEAR, JR.

References Cited in the file of this patent

UNITED STATES PATENTS

| Number | Name | Date |
| --- | --- | --- |
| 1,798,208 | Kratzer | Mar. 31, 1931 |
| 1,852,975 | Kratzer | Apr. 5, 1932 |
| 2,107,573 | Langdon et al. | Feb. 8, 1938 |
| 2,496,046 | Gilbough | Jan. 31, 1950 |
| 2,512,839 | Pruitt | June 27, 1950 |

FOREIGN PATENTS

| Number | Country | Date |
| --- | --- | --- |
| 238,019 | Great Britain | Aug. 13, 1925 |
| 272,998 | Great Britain | June 23, 1927 |
| 21,891 | Australia | Aug. 15, 1930 |
| 365,599 | Great Britain | Jan. 20, 1932 |